United States Patent
Watanabe et al.

(10) Patent No.: US 12,231,001 B2
(45) Date of Patent: Feb. 18, 2025

(54) STATOR AND MANUFACTURING METHOD THEREOF

(71) Applicant: TOYOTA JIDOSHA KABUSHIKI KAISHA, Toyota (JP)

(72) Inventors: Kohei Watanabe, Okazaki (JP); Masashi Matsumoto, Nagoya (JP); Hazuki Kawamura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 264 days.

(21) Appl. No.: 17/804,689

(22) Filed: May 31, 2022

(65) Prior Publication Data
US 2022/0393524 A1 Dec. 8, 2022

(30) Foreign Application Priority Data
Jun. 2, 2021 (JP) .................. 2021-093206

(51) Int. Cl.
*H02K 3/28* (2006.01)
*H02K 1/16* (2006.01)
*H02K 3/12* (2006.01)

(52) U.S. Cl.
CPC ............... *H02K 1/165* (2013.01); *H02K 3/12* (2013.01); *H02K 3/28* (2013.01)

(58) Field of Classification Search
CPC .................................. H02K 3/28; H02K 3/12
USPC ................................................. 310/184, 201
See application file for complete search history.

(56) References Cited

U.S. PATENT DOCUMENTS

| | | | |
|---|---|---|---|
| 5,804,902 A * | 9/1998 | Hill ..................... | H02K 3/12 310/116 |
| 10,389,199 B2 * | 8/2019 | Langlard .................. | H02K 3/12 |
| 11,489,374 B2 * | 11/2022 | Koga ..................... | H02K 1/165 |
| 2016/0254718 A1 * | 9/2016 | Watanabe ............ | H02K 15/0421 310/208 |
| 2020/0259381 A1 * | 8/2020 | Koga ..................... | H02K 3/12 |
| 2020/0366146 A1 * | 11/2020 | Koga ..................... | H02K 3/28 |

FOREIGN PATENT DOCUMENTS

| | | |
|---|---|---|
| JP | 2001-078404 A | 3/2001 |
| JP | 2015-109718 A | 6/2015 |
| JP | 2019-129658 A | 8/2019 |
| JP | 2019-205244 A | 11/2019 |
| JP | 2020-048277 A | 3/2020 |
| JP | 2020-205690 A | 12/2020 |

* cited by examiner

*Primary Examiner* — Alexander Talpalatski
(74) *Attorney, Agent, or Firm* — Finnegan, Henderson, Farabow, Garrett and Dunner LLP

(57) ABSTRACT

First-fourth slots may be provided in an inner circumferential surface of a stator core. A coil may include first-third segments conductor. Each of the conductors may include a U-shape. The first segment conductor may be inserted in the first slot and the second slot in a state where a coupling portion of the first segment conductor is located at a position facing a first end surface. The second segment conductor may be inserted in the second slot and the third slot in a state where a coupling portion of the second segment conductor may be located at a position facing a second end surface. The third segment conductor may be inserted in the third slot and the fourth slot in a state where a coupling portion of the third segment conductor may be located at a position facing the first end surface.

6 Claims, 13 Drawing Sheets

FIG. 14
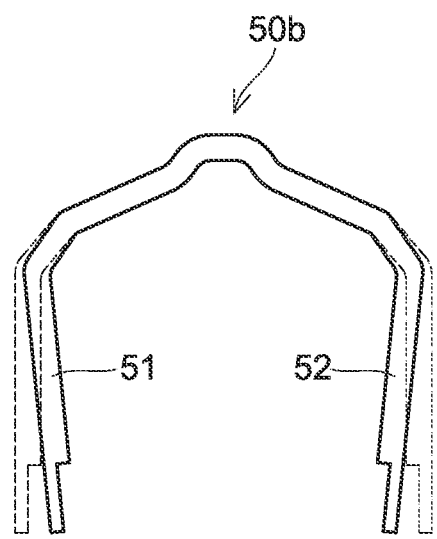
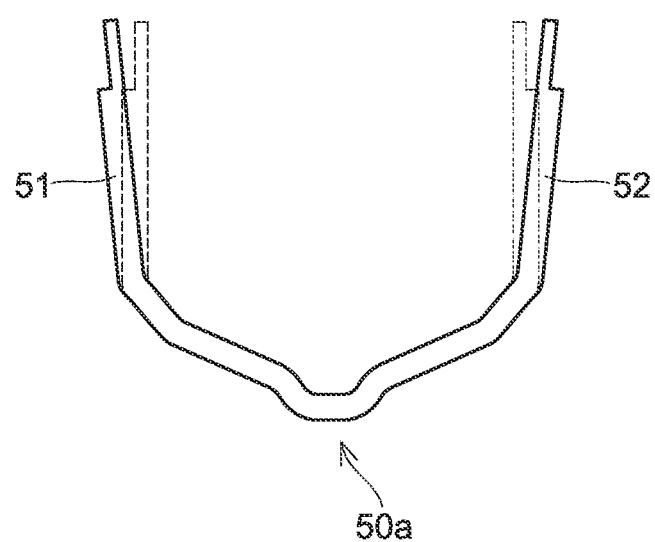

STATOR AND MANUFACTURING METHOD THEREOF

TECHNICAL FIELD

The art disclosed herein relates to a stator and a manufacturing method thereof.

BACKGROUND

Cross-Reference to Related Application

This application is a related application of Japanese Patent Application No. 2021-093206 filed on Jun. 2, 2021 and claims priority based on this Japanese patent application, contents of which are hereby incorporated by reference into the present application.

Japanese Patent Application Publication No. 2019-129658 describes a stator for a motor. The stator includes a stator core having a cylindrical shape. A plurality of slots is provided in an inner circumferential surface of the stator core along a circumferential direction with intervals between them. The stator core has a coil fixed thereto. The coil is constituted of a plurality of segment conductors each having a U shape. One or more of the segment conductors are inserted into their corresponding slots from one end of the stator (hereinbelow termed first end). Remainder of the segment conductors are inserted into their corresponding slots from the other end of the stator (hereinbelow termed second end). In each slot, an end of the segment conductor inserted into this slot from the tint end and an end of the segment conductor inserted into this slot from the second end are electrically connected in the state overlapping each other in a radial direction of the stator core. As above, the coil is configured by the segment conductors electrically connected to each other.

SUMMARY

As aforementioned, in the stator of Japanese Patent Application Publication No. 2019-129658, the ends of the segment conductors are connected in each slot in the state overlapping each other in the radial direction of the stator core. As such, in a manufacturing process of the stator, the ends of the segment conductors need to be connected in each slot by stacking these ends of the segment conductors in the radial direction of the stator core and pressing a stacked portion thereof in the radial direction of the stator core. Due to this, tool(s) and member(s) for pressing the stacked portion of the ends of the segment conductors were required. The disclosure herein proposes a stator in which segment conductor can easily be connected within each slot.

A stator disclosed herein may comprise: a stator core comprising a cylindrical shape; and a coil fixed to the stator core. The stator core may comprise a first end surface and a second end surface located on opposite sides of the stator core in an axial direction of the stator core. A first slot, a second slot, a third slot, and a fourth slot may be provided in an inner circumferential surface of the stator core. Each of the first slot, the second slot, the third slot, and the fourth slot may extend along n the axial direction from the first end surface to the second end surface. The coil may comprise a first segment conductor, a second segment conductor, and a third segment conductor. Each of the first segment conductor, the second segment conductor, and the third segment conductor may comprise a U-shape including a first linear portion, a second linear portion, and a coupling portion coupling the first linear portion and the second linear portion. The coupling portion of the first segment conductor may be located at a position facing the first end surface. The first linear portion of the first segment conductor may be inserted in the first slot. The second linear portion of the first segment conductor may be inserted in the second slot. The coupling portion of the second segment conductor may be located at a position facing the second end surface. The first linear portion of the second segment conductor may be inserted in the second slot. The second linear portion of the second segment conductor may be inserted in the third slot. The coupling portion of the third segment conductor may be located at a position facing the first end surface. The first linear portion of the third segment conductor may be inserted in the third slot. The second linear portion of the third segment conductor may be inserted in the fourth slot. A tip end of the second linear portion of the first segment conductor and a tip end of the first linear portion of the second segment conductor may be electrically connected with each other in the second slot in a state overlapping each other in a circumferential direction of the stator. A tip end of the second linear portion of the second segment conductor and a tip end of the first linear portion of the third segment conductor may be electrically connected with each other in the third slot in a state overlapping each other in the circumferential direction of the stator.

In this stator, the ends of the respective segment conductors are electrically connected to each other in the state overlapping each other in the circumferential direction of the stator core within the respective slots. Thus, the ends of the segment conductors can easily be connected within the slots.

The present disclosure also discloses a manufacturing method of a stator. The method may comprise fixing a coil to a stator core comprising a cylindrical shape. The stator core may comprise a first end surface and a second end surface located on opposite sides of the stator core in an axial direction of the stator core. A first slot, a second slot, a third slot, and a fourth slot may be provided in an inner circumferential surface of the stator core. Each of the first slot, the second slot, the third slot, and the fourth slot may extend along the axial direction from the first end surface to the second end surface. The coil may comprise a first segment conductor, a second segment conductor, and a third segment conductor. Each of the first segment conductor, the second segment conductor, and the third segment conductor may comprise a U shape including a first linear portion, a second linear portion, and a coupling portion coupling, the last linear portion and the second linear portion. The fixing of the coil to the stator care may comprise first to third processes. In the first process, the first segment conductor may be attached to the stator core such that the coupling portion Lion of the first segment conductor is located at a position facing the first end surface, the first linear portion n of the first segment conductor is inserted in the first slot, and the second linear portion of the first segment conductor is inserted in the second slot. In the second process, the second segment conductor may be attached to the stator core such that the coupling portion of the second segment conductor is located at a position lacing the second end surface, the first linear portion of the second segment conductor is inserted in the second slot, and the second linear portion of the second segment conductor is inserted in the third slot. In the third process, the third segment conductor may be attached to the stator cap such that the coupling portion of the third segment conductor is located at a position facing the first end surface, the first linear portion of the third segment conductor is inserted in the third slot, and the second linear portion of the third segment conductor is inserted in the fourth slot. The fixing of the coil to this stator core may be performed such that: a tip end of the second linear portion of the first segment conductor and a tip end of the first linear portion of the second segment conductor are electrically connected with each other in the second slot in a state overlapping each other in a circumferential direction of the stator; and a tip end of the second linear portion of the second segment conductor and a tip end of the first linear portion of the third segment conductor are electrically connected with each other in the third slot in a state overlapping each other in the circumferential direction of the stator.

In this manufacturing method, the ends of the respective segment conductors are electrically connected to each other in the state overlapping each other in the circumferential direction of the stator core within the respective slots. Thus, the ends of the segment conductors can easily be connected within the slots.

BRIEF DESCRIPTION OF DRAWINGS

FIG. 14 is an explanatory diagram of a coil of a variant.

DETAILED DESCRIPTION

Figure 1:
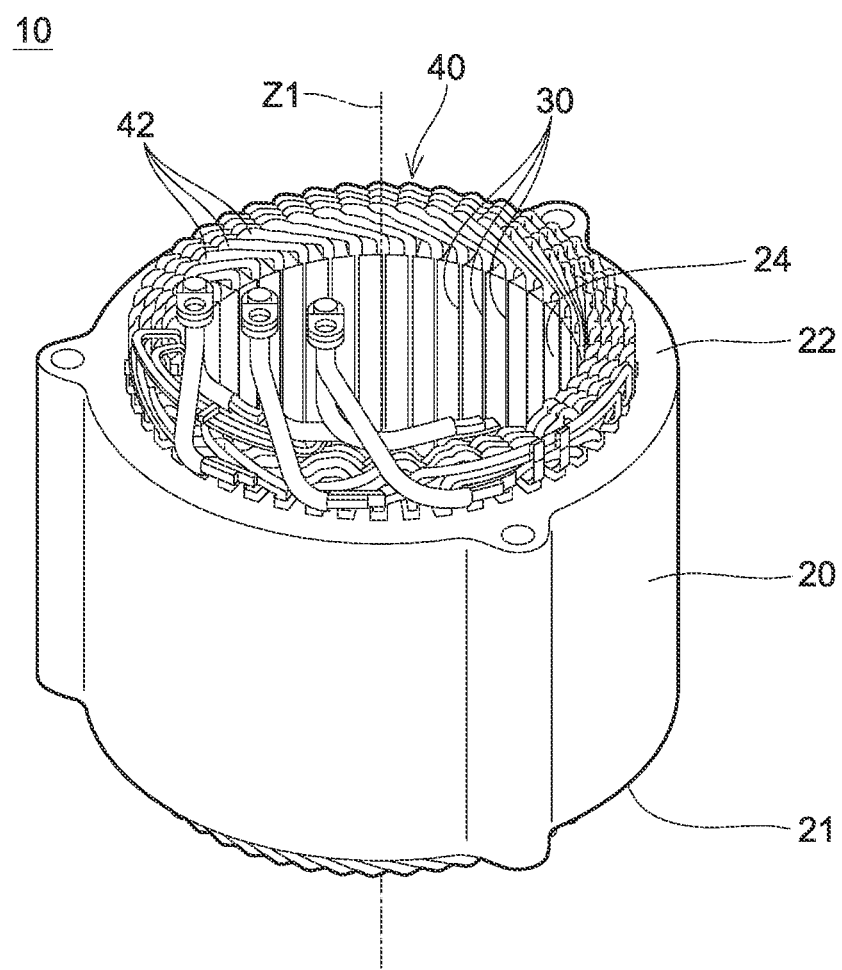
FIG. 1 is a perspective view of a stator.

In an aspect of the stator disclosed herein, the first slot, the second slot, the third slot, and the fourth slot may be arranged in the inner circumferential surface of the stator core in this order along the circumferential direction of the stator core with intervals.

According to this configuration, a coil having an undulating shape can be configured by the segment conductors.

In an aspect of the stator disclosed herein, the stator may include the following configuration. That is, in the second slot, the tip end of the second linear portion of the first segment conductor may be located closer to the third slot than the tip end of the first linear portion of the second segment conductor is. In the third slot, the tip end of the first linear portion of the third segment conductor may be located closer to the second slot than the tip end of the second linear portion of the second segment conductor is. The first segment conductor may be fixed to the stator core in a suite where the coupling portion of the first segment conductor is elastically deformed in a direction in which a clearance between the first linear portion of the first segment conductor and the second linear portion of the first segment conductor is expanded. The second segment conductor may be fixed to the stator core in a state where the coupling portion of the second segment conductor is elastically deformed in a direction in which a clearance between the first linear portion of the second segment conductor and the second linear portion of the second segment conductor is expanded. The third segment conductor may be fixed to the stator core in a state where the coupling portion of the third segment conductor is elastically deformed in a direction in which a clearance between the first linear portion of the third segment conductor and the second linear portion of the third segment conductor is expanded.

According to this configuration, contact interfaces between the ends of the segment conductors are each pressed by a reaction force due to elastic deformation of the respective segment conductors. As such, the ends of the respective segment conductors can suitably be connected.

In an aspect of the stator disclosed herein, the stator may include: the following, configuration. That is, a side surface of the tip end of the second linear portion of the first segment conductor may comprise a recess, the side surface being a side surface on a first slot side. A side surface of the tip end of the first linear portion of the second segment conductor may comprise a recess, the side surface being a side surface on a third slot side. The recess of the second linear portion of the first segment conductor and the recess of the first linear portion of the second segment conductor may be in contact with each other in the second slot. A side surface of the tip end of the second linear portion of the second segment conductor may comprise a recess, the side surface being a side surface on a second slot side. A side surface of the tip end of the first linear portion of the third segment conductor may comprise a recess, the side surface being a side surface on a fourth slot side. The recess of the second linear portion of the second segment conductor and the recess of the first linear portion of the third segment conductor may be in contact with each other in the third slot.

In an aspect of the stator disclosed herein, the stator mar include the following configuration. That is, in the second slot, the tip end of the second linear portion of the first segment conductor may be located closer to the first slot than the tip end of the first linear portion of the second segment conductor is. In the third slot, the tip end of the first linear portion of the third segment conductor may be located closer to the fourth slot than the tip end of the second linear portion of the second segment conductor is. The first segment conductor may be fixed to the stator cote in a state where the coupling portion of the first segment conductor is elastically deformed in a direction in which a clearance between the first linear portion of the first segment conductor and the second linear portion of the first segment conductor is decreased. The second segment conductor may be fixed to the stator core in a state where the coupling portion of the second segment conductor is elastically deformed in a direction in which a clearance between the first linear portion of the second segment conductor and the second linear portion of the second segment conductor is decreased. The third segment conductor may be fixed to the stator core in a state where the coupling portion of the third segment conductor is elastically deformed in a direction in which a clearance between the first linear portion of the third segment conductor and the second priest portion of the third segment conductor is decreased.

According to this configuration, the contact interfaces between the ends of the respective segment conductors are each pressed by the reaction force due to the elastic deformation of the respective segment conductors. As such, the ends of the respective segment conductors can suitably be connected.

In an aspect of the stator disclosed herein, the stator may include the following configuration. A side surface of the tip end of the second linear portion of the first segment conductor may comprise a recess, the side surface being a side surface on a third slot side. A side surface of the tip end of the first linear portion of the second segment conductor may comprise a recess, the side surface being a side surface on a first slot side. The recess of the second linear portion of the first segment conductor and the recess of the first linear portion of the second segment conductor may be in contact t with each other in the second slot. A side surface of the tip end of the second linear portion of the second segment conductor may comprise a recess, the side surface being a side surface on a fourth slot side. A Side surface of the tip end of the first linear portion of the third segment conductor may comprise a recess, the side surface being a side surface on a second slot side. The recess of the second linear portion of the second segment conductor and the recess of the first linear portion of the third segment conductor may be in contact with each other in the third slot.

In an aspect of the stator disclosed herein, the stator may include the following configuration. That is, in a cross section perpendicular to the axial direction, a contact interface between the tip end of the second linear portion of the first segment conductor and the tip end of the first linear portion of the second segment conductor may be inclined with respect to a radial direction of the stator core. A protrusion may be provided on a side surface of the second slot. A plurality, of coil wirings including a coil wiring constituted of the first segment conductor and the second segment conductor may be stacked along the radial direction in the second slot. The plurality of coil wirings may be fixed in a compressed state between the protrusion of the second slot and a bottom surface of the second slot.

According to this configuration, a force compressing the plurality of the wirings in the radial direction is applied to the contact interface between the tip end of the second linear portion of the first segment conductor and the tip end of the first linear portion of the second segment conductor. Due to this, the tip end of the second linear portion of the first segment conductor and the tip end of the first linear portion of the second segment conductor dirt more securely be connected.

In an aspect of the method of manufacturing a stator disclosed herein, the method may include the following configuration. That is, the fixing of the coil to the stator core may be performed such that: the tip end of the second linear portion of the first segment conductor is located in the second slot and is closer to the third slot than the tip end of the first linear portion of the second segment conductor is; and the tip end of the first linear portion of the third segment conductor is located in the third slot and is closer to the second slot than the tip end of the second liner portion of the second segment conductor is. In the attaching of the first segment conductor to the stator core, the first segment conductor may be fixed to the stator core in a state where the coupling portion of the first segment conductor is elastically deformed in a direction in winch a clearance between the first linear portion of the first segment conductor and the second linear portion of the first segment conductor is expanded. In the attaching of the second segment conductor to the stator core, the second segment conductor may be tried to the stator core in a state where the coupling portion of the second segment conductor is elastically deformed in a direction in which a clearance between the first linear portion of the second segment conductor and the second linear portion of the second segment conductor is expanded. In the attaching of the third segment conductor to the stator core, the third segment conductor may be fixed to the stator core in a state where the coupling portion of the third segment conductor is elastically deformed in a direction in which a clearance between the first linear portion of the third segment conductor and the second linear portion of the third segment conductor is expanded.

According to this configuration, the contact interfaces between the ends of the respective segment conductors are each pressed by the reaction force due to the elastic deformation of the respective segment conductors. As such, the ends of the respective segment conductors can suitably be connected.

In an aspect of the method of manufacturing a stator disclosed herein, the first slot, the second slot, the third slot and the fourth slot may be arranged in the inner circumferential surface of the stator core in this order along the circumferential direction of the stator core with intervals.

According to this configuration, a coil having an undulating shape can be configured by the segment conductors.

In an aspect of the method of manufacturing a stator disclosed herein, the method may include the following configuration. That is, an inner side surface of the tip end of the second linear portion of the first segment conductor may comprise a recess. An inner side surface of the tip end of the first linear portion of the second segment conductor may comprise a recess. An inner side surface of the tip end of the second linear portion of the second segment conductor may comprise a recess. An inner side surface of the tip end of the first linear portion of the third segment conductor may comprises a recess. The fixing of the coil to the stator core may be performed such that: the recess of the second linear portion of the first segment conductor and the recess of the first linear portion of the second segment conductor are in contact with each other in the second slot, and the recess of the second linear portion of the second segment conductor and the recess of the first linear portion of the third segment conductor are in contact with each other in the third slot.

In an aspect of the method of manufacturing a stator disclosed herein, the method may include the following configuration. That is, the fixing of the coil to the stator core may be performed such that: the tip end of the second linear portion of the first segment conductor is located in the second slot and is closer to the first slot than the tip end of the first linear portion of the second segment conductor is; and the tip end of the first linear portion of the third segment conductor is locoed in the third slot and is closer to the fourth slot than the tip end of the second linear portion of the second segment conductor is. In the attaching of the first segment conductor to the stator core, the first segment conductor may be fixed to the stator core in a state where the coupling portion of the first segment conductor is elastically deformed in a direction in which a clearance between the first linear portion of the first segment conductor and the second linear portion of the first segment conductor is decreased. In the attaching of the second segment conductor to the stator Core, the second segment conductor may be fixed to the stator core in a state where the coupling portion of the second segment conductor is elastically deformed in a direction in which a clearance between the first linear portion of the second segment conductor and the second linear portion of the second segment conductor is decreased. In the attaching of the third segment conductor to the stator core, the third segment conductor may be fixed to the stator core in a state where the coupling portion of the third segment conductor is elastically deformed in a direction in which a clearance between the first linear portion of the third segment conductor and the second linear portion of the third segment conductor is decreased.

According to this configuration, the contact interfaces between the ends of the respective segment conductors are each pressed by the reaction three due to the elastic deformation of the respective segment conductors. As such, the ends of the respective segment conductors can suitably be connected.

In an aspect of the method of manufacturing a stator disclosed herein, the method may include the following configuration. That is, an outer side surface of the tip end of the second linear portion of the first segment conductor may comprise a recess. An outer side surface of the tip end of the first linear portion of the second segment conductor may comprise a recess. An outer side surface of the tip end of the second linear portion of the second segment conductor may comprise a recess. An outer side surface of the tip end of the first linear portion of the third segment conductor may comprise a recess. The fixing of the coil to the stator core may be performed such that: the recess of the second linear portion of the first segment conductor and the recess of the first linear portion of the second segment conductor are in contact with each other in the second slot, and the recess of the second linear portion of the second segment conductor and the recess of the first linear portion of the third segment conductor are to contact with each other in the third slot.

In art aspect of the method of manufacturing a stator disclosed herein, the method may include the following configuration. That is, in a cross section perpendicular to the axial direction in a state where the first segment conductor and the second segment conductor are attached to the stator core, a contact interface between the tip end of the second linear portion of the first segment conductor and the tip end of the first linear portion of the second segment conductor may be inclined with respect to a radial direction of the stator core. A protrusion may be provided on a side surface of the second slot. In the fixing of the coil to the stator core, a plurality of coil wirings, which includes a coil wiring constituted of the first segment conductor and the second segment conductor, may be stacked along the radial direction in the second slot, and the stacked coil wirings may be fixed in a compressed state between the protrusion of the second slot and a bottom surface of the second slot.

According to this configuration, a force compressing the plurality of coil wirings in the radial direction is applied to the contact interface between the tip old of the second linear portion of the first segment conductor and the tip end of the first linear portion of the second segment conductor. Due to this, the tip end of the second linear portion of the first segment conductor and the tip end of the first linear portion of the second segment conductor can more securely be connected.

(First Embodiment) A stator 10 of a first embodiment shown in FIG. 1 is used in a motor. The stator 10 comprises a stator core 20 and a coil 40. The coil 40 is fixed to the stator core 20.

Figure 2:
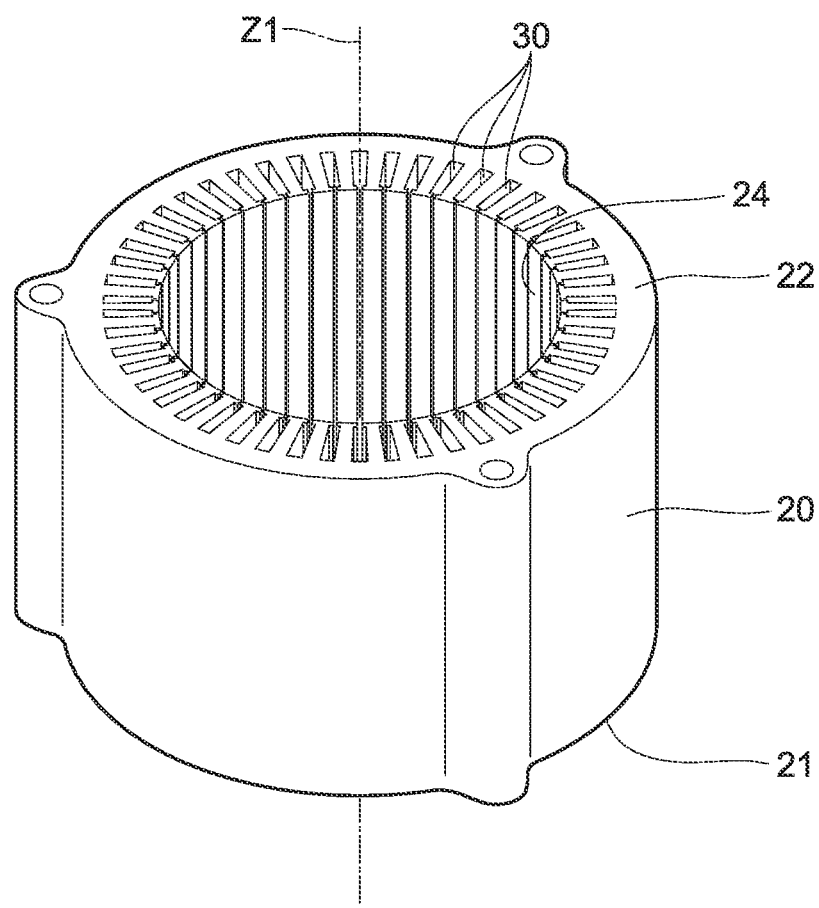
FIG. 2 is a perspective view of a stator core.
Figure 3:
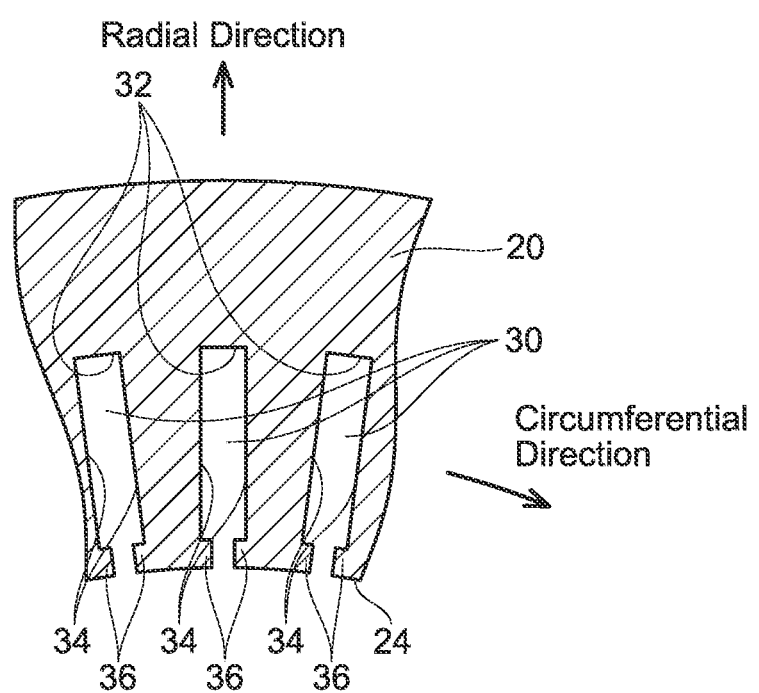
FIG. 3 is a cross-sectional view v of the stator core along a plane perpendicularly intersecting an axis Z1.

As shown in FIG. 2, the stator core 20 has a cylindrical shape have an axis Z1 as its center axis. The stator core 20 comprises an end surface 21 and an end surface 22 on its opposite sides along a direction parallel to the axis Z1 (hereinbelow termed axial direction). A plurality of slots 30 is defined in an inner circumferential surface 24 of the stator core 20. Each of the slots 30 is a groove defined in the inner circumferential surface 24. Each slot 30 extends from the end surface 21 to the end surface 22 along the axial direction. As shown in FIG. 3, the slots 30 extend in a radial direction of the stator core 20 in a cross section perpendicular to the ads Z1. In the cross section perpendicular to the axis Z1, the slots 30 each include a bottom surface 32 and two side surfaces 34. A protrusion 36 is provided on each side surface 34 at the end of the slot 30 on the inner circumferential side.

Figure 4:
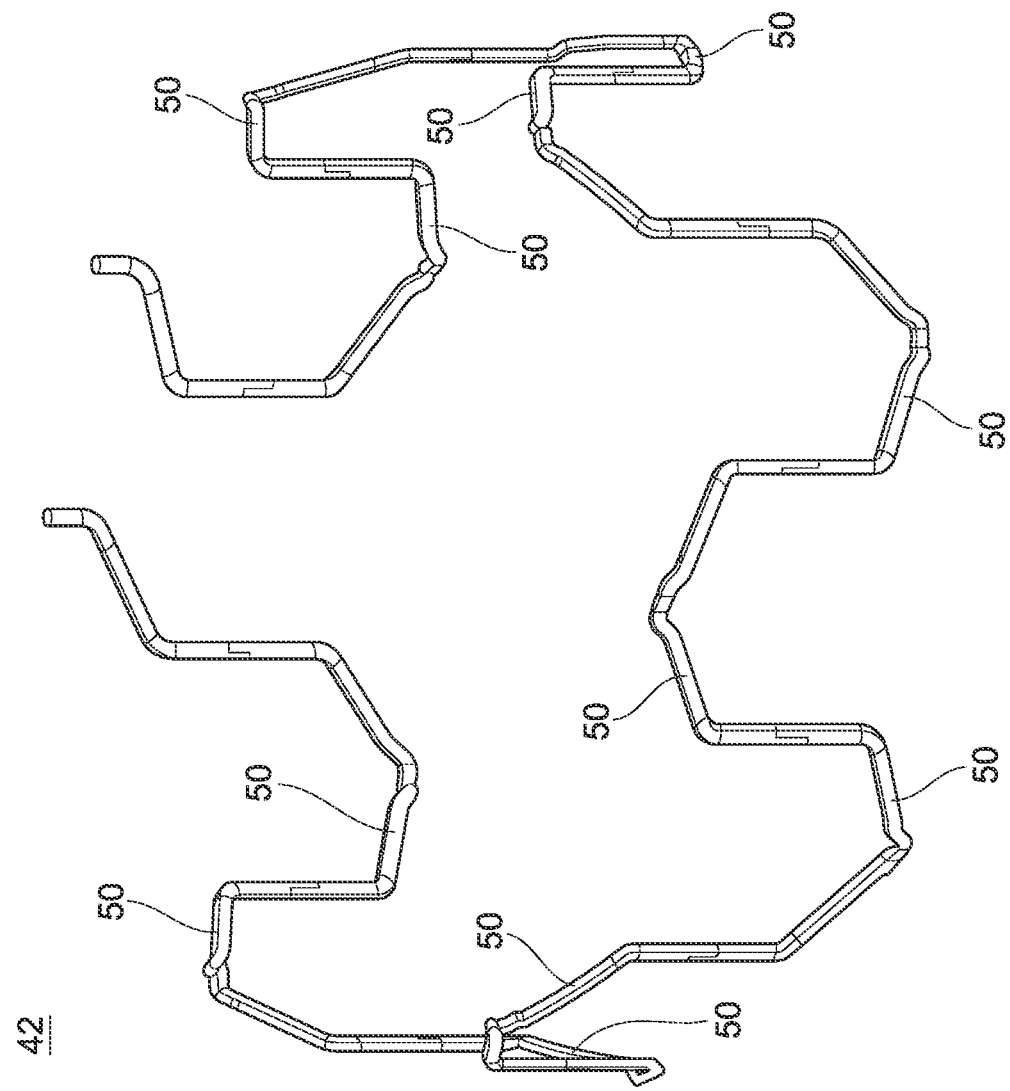
FIG. 4 is a perspective view of a coil wiring of a first embodiment.
Figure 5:
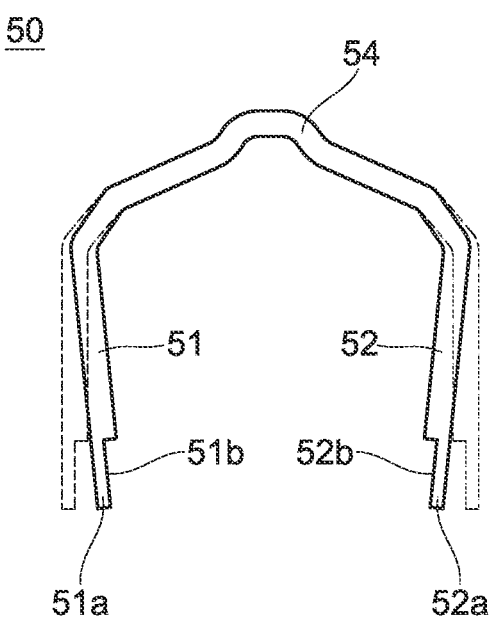
FIG. 5 is a side view of a segment conductor of the first embodiment.

As shown in FIG. 1, the coil 40 is fixed to the stator core 20 such that it extends through the respective slots 30 of the stator core 20. The coil 40 is constituted of a plurality of coil wirings 42. FIG. 4 shows one of the coil wirings 42. As shown in FIG. 4, the coil wirings 42 each have an undulating shape. More specifically, the coil wirings 42 each extend in the circumferential al direction with their undulating pattern extending in the axial direction. The coil wirings 42 are each configured by a plurality of segment conductors 50 as shown in FIG. 5 being connected to each other. Each segment conductor 50 has a U-shape. That is, each segment conductor 50 includes a linear portion 51, a linear portion 52, and a coupling portion 54. The linear portion 51 and the linear portion 52 extend substantially straight. The coupling portion 54 couples its corresponding linear portions 51, 52. The linear portion 51 and the linear portion 52 each extend such that a clearance between the linear portion 51 and the linear portion 52 decreases toward a tip end 51*a* of the linear portion 51 and a tip end 52*a* of the linear portion 52. A recess Sib is defined in the no end Si a of each linear portion 51. The recess Sib is defined in an inner side surface of the linear portion 51 (on the side closer to the linear portion 52). A recess 52*b* is defined in the tip end 52*a* of each linear portion 52. The recess 52*b* is defined in an inner side surface of the linear portion 52 (on the side closer to the linear portion 51). Although not shown, surfaces of the respective segment conductors 50 are covered by insulating films except for the recesses 51*b*, 52*b*. As shown by broken lines in FIG. 5, the coupling portion 54 can be elastically deformed by applying an external force to the segment conductor 50. By doing so, the coupling portion 54 can be elastically deformed such that the clearance between the tip end 51*a* and the tip end 52*a* is expanded. The linear portion 51 and the linear portion 52 can be made substantially parallel to each other by elastically deforming the coupling portion 54 as above. As shown in FIG. 4, each of the undulating coil wirings 42 is configured by the plurality of U-shaped segment conductors 50 being connected to each other.

Figure 6:
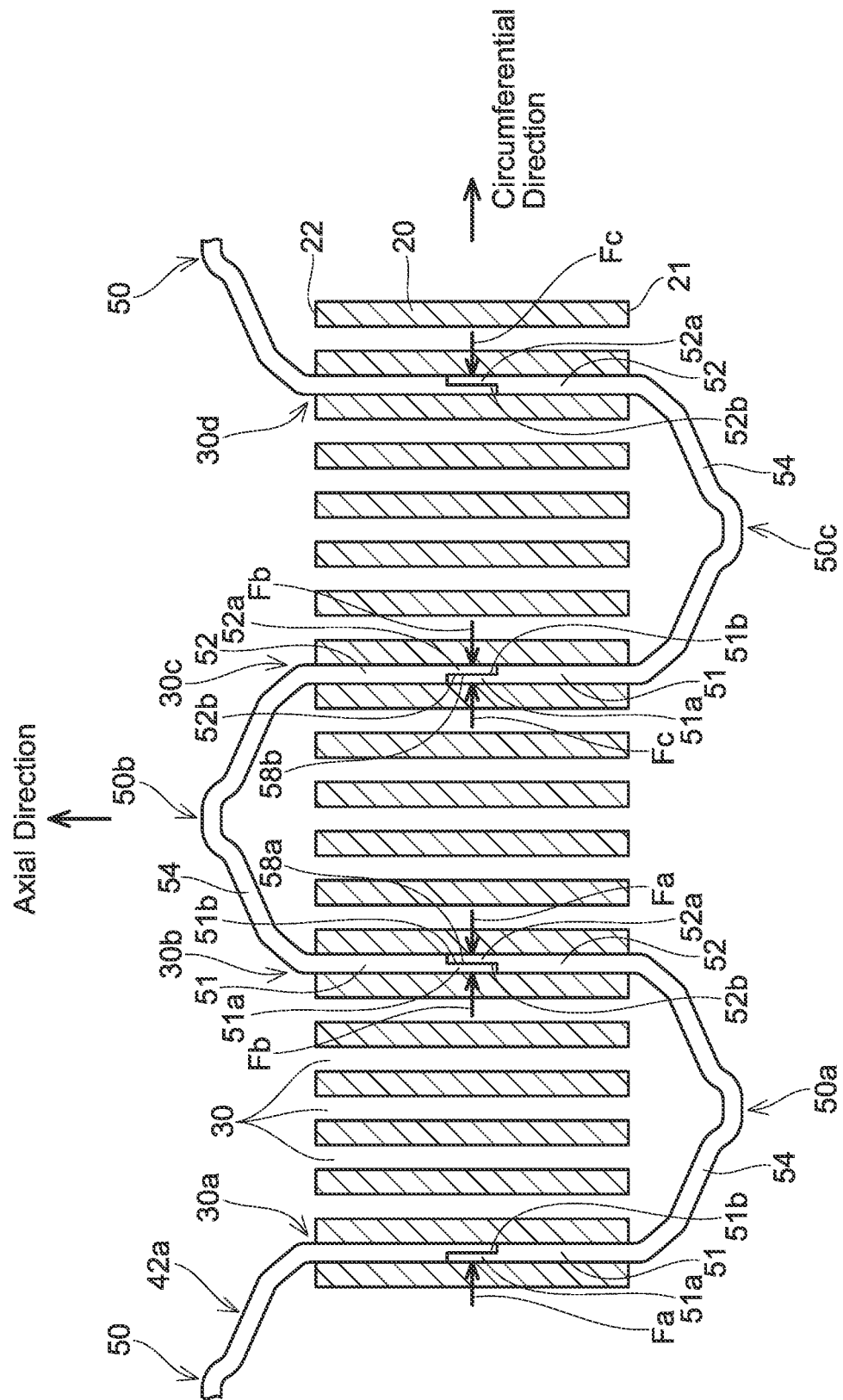
FIG. 6 shows an attachment structure of segment conductors to the stator core of the first embodiment.

FIG. 6 is a plan view of a coil wiring 42*a* fixed to the stator core 20 as viewed from the center of the stator core 20. A left-right direction of FIG. 6 is the circumferential direction of the stator core 20, and an up-down direction of FIG. 6 is the axial direction of the stator core 20. As shown in FIG. 6, the coil wiring 42*a* is inserted into slots 30*a*, 30*b*, 30*c*, 30*d* among the plurality of slots 30. The slots 30*a*, 30*b*, 30*c*, 30*d* are arranged along the circumferential direction of the stator eon 20 in this order with internals between them. A plurality of other slots 30 exists between the slot 30*a* and the slot 30*b*. A plurality of other slots 30 exists between the slot 30*b* and the slot 30*c*. A plurality of otter slots 30 exists between the slot 30*c* and the slot 30*d*. As aforementioned, the coil wiring 42*a* is constituted of a plurality of segment conductors 50. Within an area shown in FIG. 6, the coil wiring 42*a* comprises segment conductors 50*a*, 50*b*, 50*c*. The segment conductor 50*a* is inserted m the slots 30*a*, 30*b* from the end surface 21. That is, the coupling portion 54 of the segment conductor 50a is located at a position facing the end surface 21. The linear portion 51 of the segment conductor 50a is inserted in the slot 10a from the end surface 21. The linear portion 52 of the segment conductor 50a is inserted in the slot 30b from the end surface 21. The segment conductor 50a is inserted in the slots 30a, 30b in the state in which the linear portion 51 and the linear portion 52 are elastically deformed so as to be substantially parallel to each other (that is, in the state shown h the broken lines in FIG. 5). As such, in the segment conductor 50a in the state of being attached to the stator core 20, a reaction force Fa generated in the coupling portion 54 acts in a direction in which the clearance between the linear portion 51 and the linear portion 52 is decreased. The segment conductor 50b is inserted into the slots 30b, 30c from the end surface 22. That is, the coupling portion 54 of the segment conductor 50b is located at a position lacing the end surface 22. The linear portion 51 of the segment conductor 50b is inserted in the slot 30b from the end surface 22. The linear portion 52 of the segment conductor 50b is inserted in the dot 30c from the end surface 22. The segment conductor 50b is inserted in the slots 30b, 30c in the state in which the linear portion 51 and the linear portion 52 an elastically deformed so as to be substantially parallel to each other (that is, in the state shown by the broken lines in FIG. 5). As such, in the segment conductor 50b in the state of being attached to the stator core 20, a reaction force Fb generated in the coupling portion 54 acts in a direction in which the clearance between the linear portion 51 and the linear portion 52 is decreased. The segment conductor 50c is inserted into the slots 30c, 30d from the end surface 21. That is, the coupling portion 54 of the segment conductor 50c is located at a position facing the end surface 21. The linear portion 51 of the segment conductor 50c is inserted in the slot 30c from the end surface 21. The linear portion 52 of the segment conductor 50c is inserted in the slot 30d from the end surface 21. The segment conductor 50c is inserted in the slots 30c, 30d in the state in which the linear portion 51 and the linear portion 52 are elastically deformed so as to be substantially parallel to each other (that is, in the state shown by the broken lines in FIG. 5). As such, in the segment conductor 50c in the state of being attached to the stator core 20, a reaction force Fc generated in the coupling portion 54 acts in a direction in which the clearance between the linear portion 51 and the linear portion 52 is decreased.

In the slot 30b, the tip end 52a of the linear portion 52 of the segment conductor 50a and the tip end 51a of the linear portion 51 of the segment conductor 50b overlap in the circumferential direction of the stator core 20. The fir end 52a of the segment conductor 50a is located closer to the slot 30c than the up end 51a of the segment conductor 50b is to the slot 30c. The recess 52b is defined in the side surface of the tip end 52a of the segment conductor 50a, this side surface being a side surface on the slot 30a side. The recess 51b is defined in the side surface of the tip end 51a of the segment conductor 50b, this side surface being a side surface on the slot 30c side. As such, the recess 52b of the segment conductor or 50a and the recess 51b of the segment conductor 50b are in contact with each other. The reaction force Fa acts on the tip end 52a of the segment conductor 50a toward the tip end 51a of the segment conductor 50b, and the reaction force Fb acts on the tip end 51a of the segment conductor 50b toward the tip end 52a of the segment conductor 50a. The segment conductor 50a and the segment conductor 50b are fixed to each other by the reaction forces Fa, Fb being applied to a contact interface 58a between the tip end 52a of the segment conductor 50a and the tip end 51a of the segment conductor 50b. Further, the segment conductor 50a and the segment conductor 50b an electrically connected at the contact interface 58a due to pressure application on the contact interface 58a by the reaction forces Fa, Fb.

In the slot 30c, the tip end 52a of the linear portion 52 of the segment conductor 50b and the tip end 51a of the linear portion 51 of the segment conductor 50c overlap in the circumferential direction of the stator core 20. The tip end 52a of the segment conductor 50b is located closer to the slot 30d than the tip end 51a of the segment conductor 50c is to the slot 30d. The recess 52b is defined in the side surface of the tip end 52a of the segment conductor 50b, this side surface being a side surface on the slot 30b side. The recess 51b is defined in the side surface of the tip end 51a of the segment conductor 50c, this side surface being a side surface on the slot 30d side. As such, the recess 52b of the segment conductor 50b and the recess 51b of the segment conductor 50c are in contact with each other. The reaction force Fb acts on the tip end 52a of the segment conductor 50b toward the tip end 51a of the segment conductor 50c, and the reaction force Fc acts on the tip end 51a of the segment conductor 50c toward the tip end 52a of the segment conductor 50b. The segment conductor 50b and the segment conductor 50c are fixed to each other by the reaction forces Fb, Fc being applied to a contact interface 58b between the tip end 52a of the segment conductor 50b and the tip end 51a of the segment conductor 50c. Further, the segment conductor 50b and the segment conductor 50c are electrically connected at the contact interface 58b due to pressure application on the contact interface 58b by the reaction forces Fb, Fc.

Figure 7:
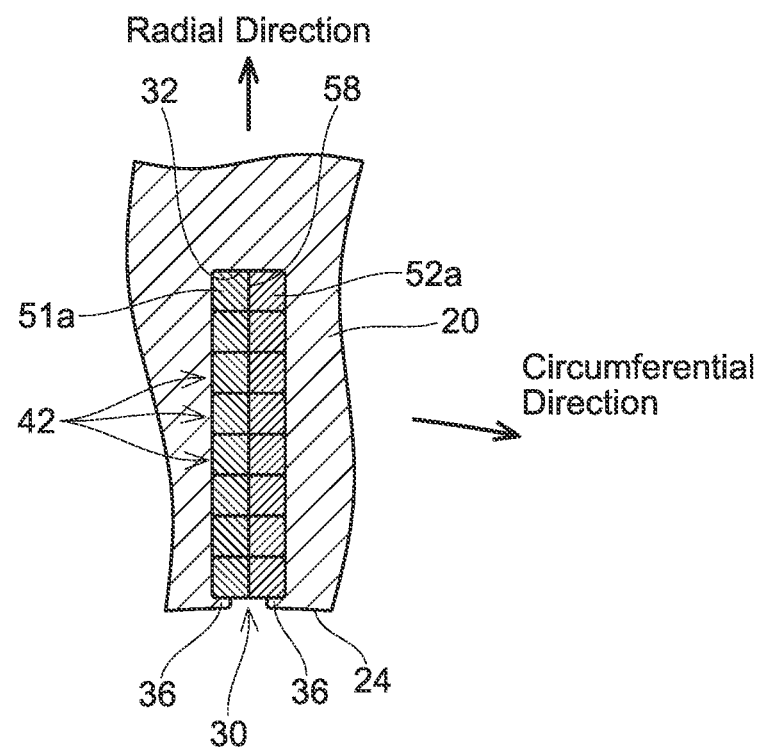
FIG. 7 is a cross-sectional view of a slot and coil wirings of the first embodiment along a plane perpendicularly intersecting the axis Z1.

The segment conductor 50a, 50b, 50c are connected as above by the reaction forces Fa, Fb, Fc. As such, a coupling material is not arranged on the contact interface 58a between the segment conductor 50a and the segment conductor 50b nor on the contact interface 58b between the segment conductor 50b and the segment conductor 50c. That is, the contact interfaces 58a, 58b are physically, and electrically connected without coupling materials. All the segment conductors 50 constituting the coil wiring 42a are connected to each other by the same configurations. Further, the other coil wirings 42 are configured similar to the coil wiring 42a. As shown in FIG. 7, a plurality of coil wirings 42 is inserted in each slot 30. In each slot 30, the plurality of coil wirings 42 is stacked in the radial direction of the stator core 20.

Next, a manufacturing method of the stator 10) will be described. The manufacturing method of the stator 10 includes fixing the coil 40 to the stator core 20. In this process, the coil wirings 42 are configured by attaching the segment conductors 50 to the stator core 20 in the elastically deformed state. The coil 40 is configured by completing the plurality of coil wiring 42. Hereinbelow, attaching of the segment conductors 50 will be described in detail.

In attaching the segment conductor 50a to the stator core 20, as shown in FIG. 6, its linear portions 51, 52 are inserted into the slots 30a, 30b corn the end surface 21. Here, the linear portions 51, 52 are inserted into the slots 30a, 30b with the coupling portion 54 elastically deformed as shown by the broken lines of FIG. 5. In attaching the segment conductor 50b to the stator core 20, as shown in FIG. 6, its linear portions 51, 52 are inserted into the slots 30b, 30c from the end surface 22. Here, the linear portions 51, 52 are inserted into the slots 30b, 30c with the coupling portion 54 elastically deformed as shown by the broken lines of FIG. 5. At this occasion within the slot 30b, the tip end 51a of the segment conductor 50b is arranged closer to the slot 30a than the up end 52a of the segment conductor 50a is to the slot 30a. In attaching the segment conductor 50c to the stator core 20, as shown in FIG. 6, its linear portions 51, 32 are inserted into the slots 30c, 30d from the end surface 21. Here, the linear portions 51, 52 are inserted into the slots 30c, 30d with the coupling portion 54 elastically deformed as shown by the broken lines of FIG. 5. At this occasion within the slot 30c, the tip end 51a of the segment conductor 50c is arranged closer to the slot 30b than the tip end 52a of the segment conductor 50b is to the slot 30b.

The plurality of segment conductors 50 including the segment conductors 50a, 50b, 50c (that is, the plurality of segment conductors 50 constituting the coil wiring 42a) is inserted into their corresponding slots 30 in the same way as above. Next, external forces elastically deforming the respective segment conductors 50 are released. By doing so, the segment conductors 50 each deform by effectuation of the reaction force, and the contact interfaces between the respective pairs of the segment conductors 50 are thereby compressed. As a result, the respective pairs of the segment conductors 50 are electrically and physically connected. For example, the segment conductor 50a and the segment conductor 50b are physically and electrically connected at the contact interface 53a by the contact interface 58a being compressed by the reaction forces Fa, Fb. Further, the segment conductor 50b and the segment conductor 50c are physically and electrically connected at the contact interface 58b by the contact interface 58b being compressed by the reaction forces Fb, Fc. By the respective segment conductors 50 being connected as above, the coil wiring 42a is configured and the coil wiring 42a is thereby fixed to the stator core 20. By fixing the respective coil wirings 42 to the stator core 20 in the same way as above, the coil 40 is configured and the coil 40 is thereby fixed to the stator core 20.

As above, in this manufacturing method, the respective segment conductors 50 are inserted into their corresponding slots 30 in the elastically deformed state, and these segment conductors 50 are connected to each other by thereafter effectuating the reaction forces of the segment conductors 50. As such, the segment conductors 50 can easily be connected, and the coil 40 can easily be fixed to the stator core 20. Further, since the respective segment conductors 50 do not need to be pressed by a tool in the slots 30, such a tool for pressing them is not necessary. Thus, changing the tool for pressing is not necessary even when multiple types of stators with stator cores 20 having different shapes are manufactured, and the multiple types of stators can efficiently be manufactured. Further, in this manufacturing method, the respective segment conductors 50 are connected to each other by the reaction forces, the coupling material is not necessary on the contact interfaces between the segment conductors 50. Thus, the stator 10 can more efficiently be manufactured. Further by connecting the respective segment conductors 50 within the slots 30 as above, connecting portions of segment conductors does not need to be provided outside the slots 30. Due to this, size and weight of the coil 40 can be reduced, and copper loss in the coil 40 can be reduced. In another embodiment, the coupling material may be provided on the contact interfaces between the segment conductors.

Figure 8:
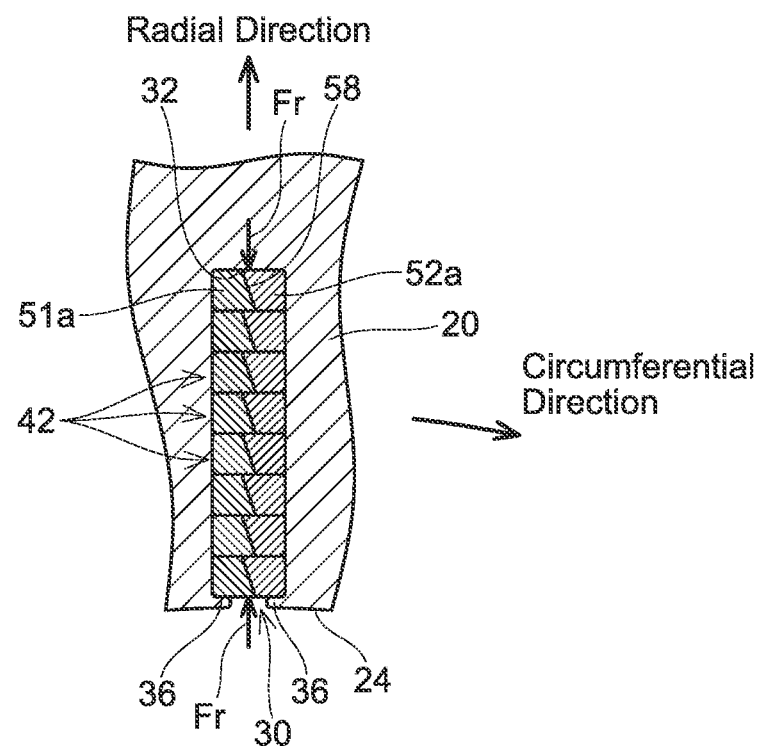
FIG. 8 is a cross-sectional view of a slot and coil wirings of a second embodiment along a plane perpendicularly intersecting the axis Z1.
Figure 9:
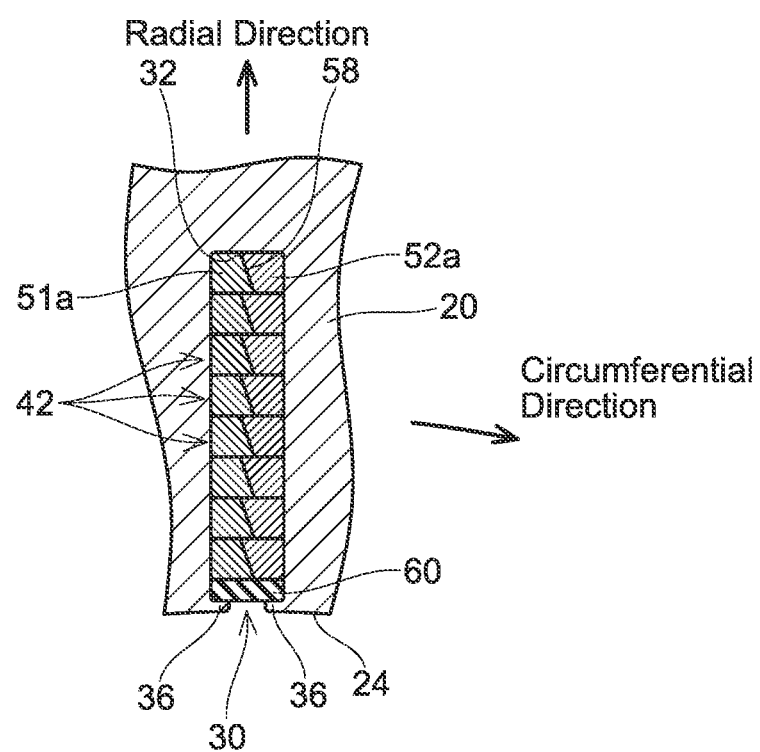
FIG. 9 shows a variant of the second embodiment.

(Second Embodiment) A stator of a second embodiment has a different shape of the contact interfaces 58 between the segment conductors 50 from that of the stator 10 of the first embodiment. As shown in FIG. 8, in the second embodiment, the contact interface 58 between each pair of the tip ends 51a, 52a is inclined with respect to the radial direction of the stator core 20. Further, in the second embodiment, a plurality, of coil wirings 42 is fixed between a bottom surface 32 and the protrusions 36 of each slot 30 in a compressed state. That is, when the last segment conductor 50 is to be inserted into each slot 30 in the manufacturing process of the stator, this last segment conductor 50 is press-fitted into the slot 30. Due to this, compression force Fr is applied to the respective coil wirings 42 within the slot 30 along the radial direction of the stator core 20 as shown by arrows. Since the respective contact interfaces 58 are inclined with respect to the radial direction, the compression force Fr applied to the respective coil wirings 42 is applied to the respective contact interfaces 58. As above, in the second embodiment, the segment conductors 50 can more firmly be fixed and can be electrically connected with low contact resistance due to a higher pressure being applied to the contact interfaces 58. As shown in FIG. 9, pressure may be applied to the coil wirings 42 in the radial direction by press-fitting a member 60 that is not the segment conductors 50 into the slot 30.

(Third Embodiment) In a stator of a third embodiment, a shape of the segment conductors 50 is different from that of the first embodiment. The other configurations of the stator of the third embodiment are the same as those of the stator 10 of the first embodiment.

Figure 10:
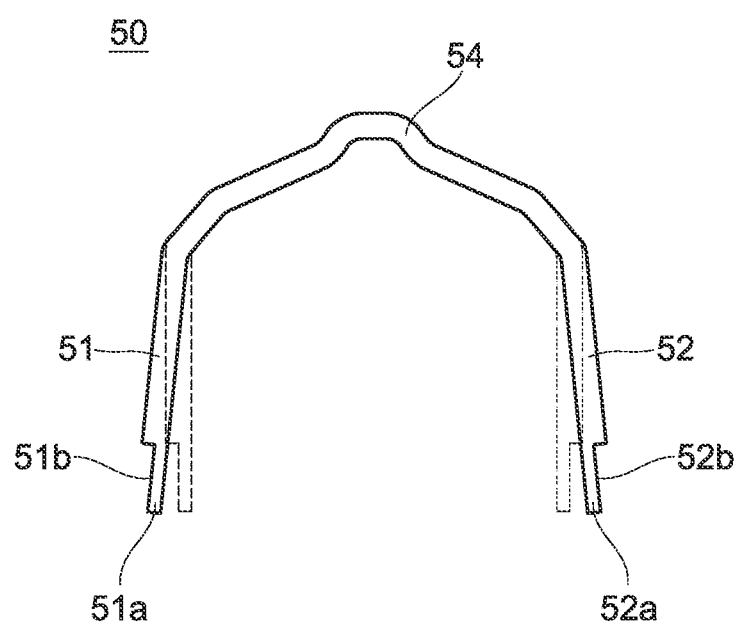
FIG. 10 shows a side view of a segment conductor of a third embodiment.

FIG. 10 shows the segment conductor 50 of the third embodiment. In the segment conductor 50 of the third embodiment, each of the linear portion 51 and the linear portion 52 extends such that the clearance between the linear portion 51 and the linear portion 52 expands toward the tip ends 51a, 52a. Further, in the segment conductor 50 of the third embodiment, the recess 51b is defined in an outer side surface of the linear portion 51 (on a aide farther away from the linear portion 52). Further, in the segment conductor 50 of the third embodiment, the recess 52b is defined in an outer side surface of the linear portion 52 (on a sale farther away horn the linear portion 51). As shown by broken lines in FIG. 10, by applying an external force to the segment conductor 50, the coupling portion 54 can be elastically deformed such that the clearance between the tip end 51a and the tip end 52a is decreased. The linear portion 51 and the linear portion 52 can be made substantially parallel to each other by elastically deforming the coupling portion 54 as above. The other configurations of the segment conductors 511 of the third embodiment are the same as those of the segment conductors 50 of the first embodiment.

Figure 11:
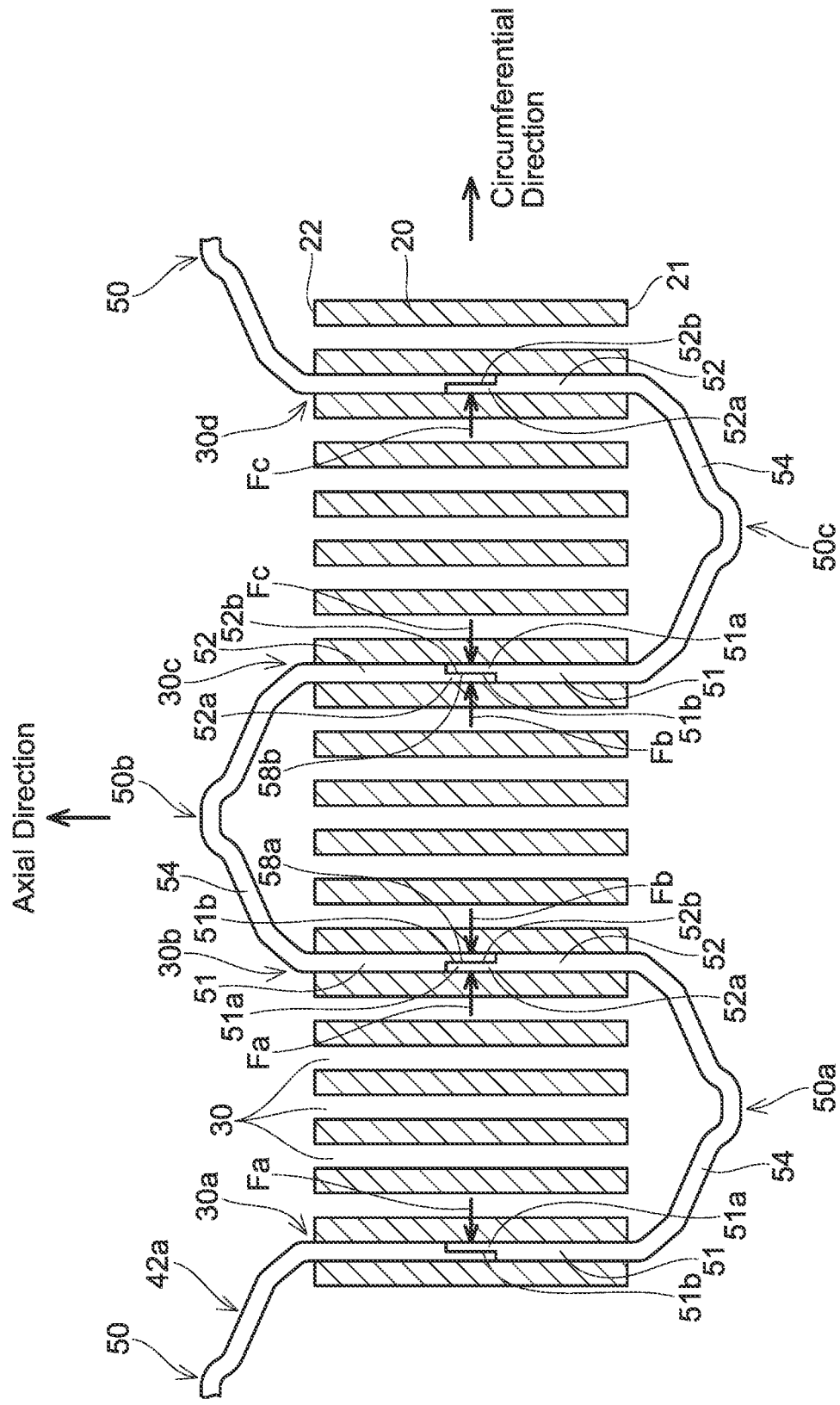
FIG. 11 shows an attachment structure of segment conductors to a stator core of the third embodiment.

FIG. 11 shows an attachment structure of the segment conductors 51) to the stator core 20 in the stator of the third embodiment. As shown in FIG. 11, in the third embodiment as well, as with the first embodiment, the segment conductor 50a is inserted in the slots 30a, 30b from the end surface 21, the segment conductor 50b is inserted in the slots 30b, 30c from the end surface 22, and the segment conductor 50c is inserted in the slots 30c, 30d from the end surface 21. The segment conductor 50a is inserted in the slots 30a, 30b in the state in which the linear portion 51 and the linear portion 52 are elastically deformed so as to be substantially parallel to each other (that is, in the stage shown by the broken lines in FIG. 10). As such, in the segment conductor 50a in the state of being attached to the stator core 20, the reaction force Fa generated aerated in the coupling portion 54 acts in a direction in which the clearance between the linear portion 51 and the linear portion 52 is expanded. The segment conductor 50b is inserted in the slots 30b, 30c in the state in which the linear portion 51 and the linear portion 52 are elastically deformed so as to be substantially parallel to each other (that is, in the state shown by the broken line in FIG. 10). As such, in the segment conductor Sub in the state of being attached to the stator core 20, the reaction force Fb generated in the coupling portion 54 acts in a direction in which the clearance between the linear portion 51 and the linear portion 52 is expanded. The segment conductor 50c is inserted in the slots 30c, 30d in the state in which the linear portion 51 and the linear portion 52 at elastically deformed so an to be substantially parallel to each other (that is, in the state shown by the broken lines in FIG. 10). As such, in the segment conductor 50c in the state of being attached to the stator core 20, the reaction force Fc generated in the coupling portion 54 acts in a direction in which the clearance between the linear portion 51 and the linear portion 52 is expanded.

In the slot 30b, the tip end 52a of the linear portion 52 of the segment conductor 50a and the tip end 51a of the linear portion 51 of the segment conductor 50b overlap in the circumferential direction of the stator core 20. The tip end 52a of the segment conductor 50a in locate closer to the slot 30a than the tip end 51a of the segment conductor 30b is to the slot 30a. The recess 52b is defined in the side sort ee of the tip end 52a of the segment conductor 50a, this side surface being a side surface on the slot 30c side. The recess 51b is defined in the side surface of the tip end 51a of the segment conductor 50b, this side surface being a side surface on the slot 30a side. As such, the recess 52b of the segment conductor 50a and the recess 51b of the segment conductor 50b are in contact with each other. The reaction force Fa acts on the tip end 52a of the segment conductor 50a toward the tip end 51a of the segment conductor 50b, and the reaction force Fb acts on the tip end 51a of the segment conductor 50b toward the tip end 52a of the segment conductor 50a. The segment conductor 50a and the segment conductor 50b are fixed to each other by the reaction forces Fa, Fb being applied to the contact interface 58a between the tip end 52a of the segment conductor 50a and the tip end ea of the segment conductor 50b. Purifier, the segment conductor 50a and the segment conductor 50b are electrically connected at the contact interface 58a due to the pressure application on the contact interface 58a by the reaction forces Fa, Fb.

In the slot 30c, the up end 52a of the linear portion 52 of the segment conductor 50b and the tip end 51a of the linear portion 51 of the segment conductor 50c overlap in the circumferential direction of the stator core 20. The tip end 52a of the segment conductor 50b is located closer to the slot 30b than the tip end 51a if the segment conductor 50c is to the slot 30b. The recess 52b is defined at the side surface of the tip end 52a of the segment conductor 50b, this side surface being a side surface on the slot 30d side. The recess 51b is defined in the side surface of the tip end 51a of the segment conductor 50c, this side surface being a side surface on the dot 30b side. As such, the recess 52b of the segment conductor 50b and the recess 51b of the segment conductor 50c are in contact with each other. The reaction force Fb on the tip end 52 of the segment conductor 50b toward the tip end 51a of the segment conductor 50c, and the reaction force Fc acts on the tip end 51a of the segment conductor 50c toward the tip end 52a of the segment conductor 50b. The segment conductor 50b and the segment conductor 50c are fixed to each other by the reaction forces Fb, Fc being applied to the contact interface 58b between the tip end 52a of the segment conductor 50b and the up end 51a of the segment conductor 50c. Further, the segment conductor for 50b and the segment conductor 50c are electrically connected at the contact interface 58b due to the pressure application on the contact interact 58b by the reaction forces Fb, Fc.

As above, in the third embodiment as well, the Segment conductors 50a, 50b, 50c are connected to each other by the reaction forces Fa, Fb, Fc. As such, a coupling material is not arranged on the contact interlace 58a between the segment conductor 50a and the segment conductor 50b nor on the contact interface 58b between the segment conductor 50b and the segment conductor 50c. That is, the contact interfaces 58a, 58b are physically and electrically connected without coupling materials.

The attaching of the segment conductors 50 of the third embodiment will be described.

In attaching the segment conductor 50a to the stator core 20, its linear portions 51, 52 are inserted into the slots 30a, 30b from the end surface 21 with the coupling portion 54 elastically deformed as shown by the broken lines of FIG. 10. In attaching the segment conductor 50b to the stator core 20, its linear portions 51, 52 are inserted into the slots 30b, 30c from the end surface 22 with the coupling portion 54 elastically deform d as shown by the broken lines of FIG. 10. Here, within the slot 30b, the tip end 51a of the segment conductor 50b is arranged to be closer to the slot 30c than the tip end 52a of the segment conductor 50a is to the slot 30c. In attaching the segment conductor 50c to the stator core 20, its linear portions 51, 52 art inserted into the slots 30c, 30d from the end surface 21 with the coupling portion 54 elastically deformed as shown by the broken lines of FIG. 10. Here, within the slot 30c, the tip end 51a of the segment conductor 50c is arranged closer to the slot 30d than the tip end 52a of the segment conductor 50b is to the slot 30d.

The plurality of segment conductors 50 including the segment conductors 50a, 50b, 50c (that is, the plurality of segment conductors 50 constituting the coil wiring 42a) is inserted into their corresponding slots 30 in the same way as above. Next, the external forces elastically deforming the respective segment conductors 50 are released. By doing so, the segment conductors 50 each deform by effectuation of the reaction force, and the contact interfaces between the respective pairs of the segment conductors 50 are thereby compressed. As a result, the respective pairs of the segment conductors 50 are electrically and physically connected. For example, the segment conductor 50a and the serpent conductor 50b are physically and electrically connected at the contact interface 58a by the contact interface 58a being compressed by the reaction forces Fa, Fb. Further, the segment conductor 50b and the segment conductor 50c are physically and electrically connected at the contact interface 58b by the contact interface 58b being compressed the reaction forces Fb, Fc. By the respective segment conductors 50 being connected as above, the coil wiring 42a is configured and the coil wiring 42a is thereby fixed to the stator core 20. In the same way, the coil 40 is configured by fixing the respective coil wirings 42 to the stator 20 and the cod 40 is thereby fixed to the stator core 20.

As above, in the manufacturing method of the third embodiment as well, the segment conductors 50 can easily be connected and the coil 10 can easily be fixed to the stator core 20. In another embodiment, the coupling material may be provided on the contact interfaces between the segment conductors.

In the third embodiment as well, the respective contact interfaces 58 may be inclined with respect to the radial direction of the stator core 20 as in the second embodiment (that is, FIGS. 8 and 9). In this case, coil wiring(s) 42 or other member(s) 60 may be inserted into each slot 30 so that pressure is applied in the radial direction of the stator core 20 to the respective coil wirings 42 in each slot 30. By modifying the configuration of the third embodiment, higher pressure is applied to each of the contact interfaces 58. Thus, the segment conductors 50 can more firmly be connected to each other and also be connected with lower resistance.

In the aforementioned first to third embodiments, the contact interlaces 58 are flat, however, the contact interfaces 58 rues each have protrusion(s) of recess(s). That is, each contact interface 58 may be configured by surfaces having such protrusion(s) or recess(es) engaging with each other.

Further, in the aforementioned first to third embodiments, the coil 40 is inserted into the slots 30a, 30b, 30c, 30d located with intervals between each other, however, the coil maybe inserted into adjacent slots 30.

The end surface 21 in the first to third embodiments is an example of a first end surface. The end surface 22 in the first to third embodiments is an example of a second end surface. The slot 30a in the first to third embodiments is an example of a first slot. The slot 30b in the first to third embodiments is an example of a second slot. The slot 30c in the first to third embodiments is an example of a third slot. The slot 30d in the first to third embodiments is an example of a fourth slot. The segment conductor 50a in the first to third embodiments is an example of a first segment conductor. The segment conductor 50b in the first to third embodiments is an example of a second segment conductor. The segment conductor 50c m the first to third embodiments is an example of a third segment conductor. The linear portions 51 in the first to third embodiments are examples of a first linear portion. The linear portions 52 in the first to third embodiments are examples of a second linear portion.

Figure 12:
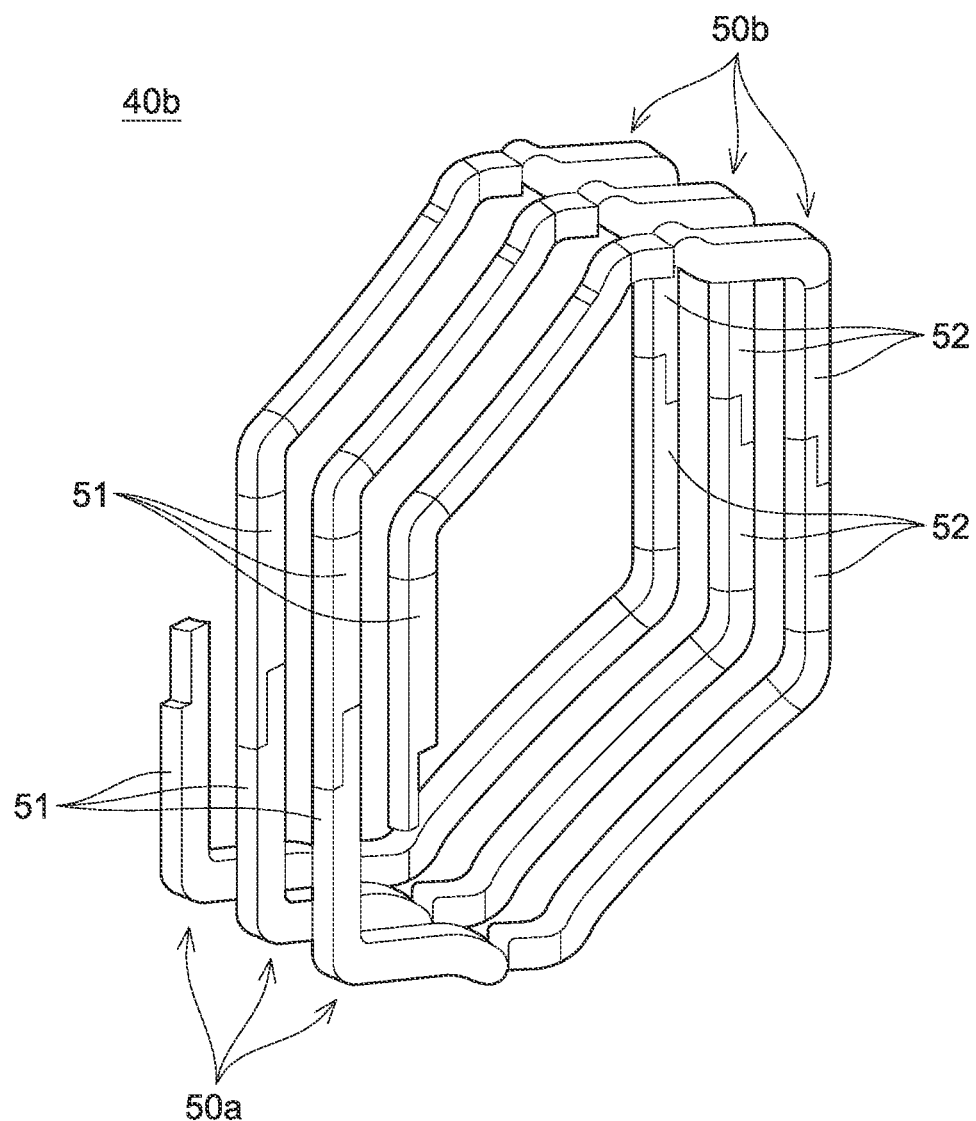
FIG. 12 is an explanatory diagram of a coil of a variant.
Figure 13:
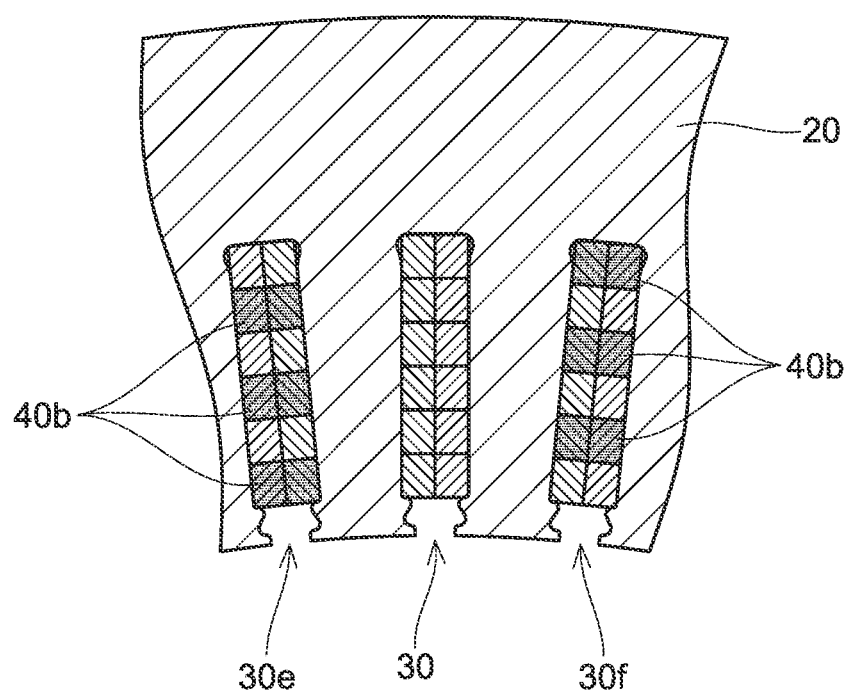
FIG. 13 is an explanatory diagram of a coil of a variant.

In the aforementioned first to third embodiments, the coil 40 is an undulating coil. However, the coil 40 may be of a winding type. FIGS. 12 and 13 show a winding coil 40b. The coil 40b is wound so as to pass through slots 30e, 30f multiple times. As shown in FIG. 12, in the coil 40b, a segment conductor 50a inserted from an end surface 21 is a segment conductor 50 in which the reaction force acts outward similar to FIG. 10, and a segment conductor 50b inserted from an end surface 22 is a segment conductor 50 in which the reaction force acts inward similar to FIG. 5. Linear portions 51 of the segment conductors 50a, 50b are inserted into the slot 30e, and linear portions 52 of the segment conductors 50a, 50b are inserted into the slot 30f. As shown in FIG. 12, the coil 40b extending in a spiral shape is configured by opposite ends of the segment conductors 50 being connected to different segment conductors 50. With this configuration as well, the segment conductors 50a, 50b are connected to each other by the reaction forces of the segment conductors 50a, 50b. In this configuration, the slot 30e is art example of first and third slots. That is, in this configuration, the first and third slots are constituted by a common slot 30e. Further, in this configuration, the slot 30f is an example of second and fourth slots. That is, in this configuration, the second and fourth slots are constituted by a common slot 30f.

While specific examples of the present disclosure base been described above in detail, these examples are merely illustrative and place no limitation on the scope of the patent claims. The technology described in the patent claims also encompasses various changes and modifications to the specific examples described above. The technical elements explained in the present description or drawings provide technical utility either independently or through various combinations. The present disclosure is not limited to the combinations described at the time the claims are filed. Further, the purpose of the examples illustrated fry the present description or drawings is to satisfy multiple objectives simultaneously, and satisfying any one of those objectives gives technical utility to the present disclosure. While specific examples of the present disclosure have been described above in detail, these examples are merely illustrative and place no limitation on the scope of the patent claims. The technology described in the patent claims also encompasses various changes and modifications to the specific examples described above. The technical elements explained in the present description or drawing provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

What is claimed is:

1. A stator comprising:
   a stator core comprising a cylindrical shape; and
   a coil fixed to the stator core,
   wherein
   the stator core comprises a first end surface and a second end surface located on opposite sides of the stator core in an axial direction of the stator core,
   a first slot, a second slot, a third slot, and a fourth slot are provided in an inner circumferential surface of the stator core,
   each of the first slot, the second slot, the third slot, and the fourth slot extends along the axial direction from the first end surface to the second end surface,
   the coil comprises a first segment conductor, a second segment conductor, and a third segment conductor,
   each of the first segment conductor, the second segment conductor, and the third segment conductor comprises a U-shape including a first linear portion, a second linear portion, and a coupling portion coupling the first linear portion and the second linear portion,
   the coupling portion of the first segment conductor is located at a position facing the first end surface,
   the first linear portion of the first segment conductor is inserted in the first slot,
   the second linear portion of the first segment conductor is inserted in the second slot,
   the coupling portion of the second segment conductor is located at a position facing the second end surface,
   the first linear portion of the second segment conductor is inserted in the second slot,
   the second linear portion of the second segment conductor is inserted in the third slot,
   the coupling portion of the third segment conductor is located at a position facing the first end surface,
   the first linear portion of the third segment conductor is inserted in the third slot,
   the second linear portion of the third segment conductor is inserted in the fourth slot,
   a tip end of the second linear portion of the first segment conductor and a tip end of the first linear portion of the second segment conductor are electrically connected with each other in the second slot in a state overlapping each other in a circumferential direction of the stator, and
   a tip end of the second linear portion of the second segment conductor and a tip end of the first linear portion of the third segment conductor are electrically connected with each other in the third slot in a state overlapping each other in the circumferential direction of the stator, and wherein
in a cross section perpendicular to the axial direction, a contact interface between the tip end of the second linear portion of the first segment conductor and the tip end of the first linear portion of the second segment conductor is inclined with respect to a radial direction of the stator core,
a protrusion is provided on a side surface of the second slot,
a plurality of coil wirings including a coil wiring constituted of the first segment conductor and the second segment conductor is stacked along the radial direction in the second slot, and
the plurality of coil wirings is fixed in a compressed state between the protrusion of the second slot and a bottom surface of the second slot.

2. The stator of claim 1, wherein the first slot, the second slot, the third slot, and the fourth slot are arranged in the inner circumferential surface of the stator core in this order along the circumferential direction of the stator core with intervals.

3. The stator of claim 2, wherein
in the second slot, the tip end of the second linear portion of the first segment conductor is located closer to the third slot than the tip end of the first linear portion of the second segment conductor is,
in the third slot, the tip end of the first linear portion of the third segment conductor is located closer to the second slot than the tip end of the second linear portion of the second segment conductor is,
the first segment conductor is fixed to the stator core in a state where the coupling portion of the first segment conductor is elastically deformed in a direction in which a clearance between the first linear portion of the first segment conductor and the second linear portion of the first segment conductor is expanded,
the second segment conductor is fixed to the stator core in a state where the coupling portion of the second segment conductor is elastically deformed in a direction in which a clearance between the first linear portion of the second segment conductor and the second linear portion of the second segment conductor is expanded, and
the third segment conductor is fixed to the stator core in a state where the coupling portion of the third segment conductor is elastically deformed in a direction in which a clearance between the first linear portion of the third segment conductor and the second linear portion of the third segment conductor is expanded.

4. The stator of claim 3, wherein
a side surface of the tip end of the second linear portion of the first segment conductor comprises a recess, the side surface being a side surface on a first slot side,
a side surface of the tip end of the first linear portion of the second segment conductor comprises a recess, the side surface being a side surface on a third slot side,
the recess of the second linear portion of the first segment conductor and the recess of the first linear portion of the second segment conductor are in contact with each other in the second slot,
a side surface of the tip end of the second linear portion of the second segment conductor comprises a recess, the side surface being a side surface on a second slot side,
a side surface of the tip end of the first linear portion of the third segment conductor comprises a recess, the side surface being a side surface on a fourth slot side, and
the recess of the second linear portion of the second segment conductor and the recess of the first linear portion of the third segment conductor are in contact with each other in the third slot.

5. The stator of claim 2, wherein
in the second slot, the tip end of the second linear portion of the first segment conductor is located closer to the first slot than the tip end of the first linear portion of the second segment conductor is,
in the third slot, the tip end of the first linear portion of the third segment conductor is located closer to the fourth slot than the tip end of the second linear portion of the second segment conductor is,
the first segment conductor is fixed to the stator core in a state where the coupling portion of the first segment conductor is elastically deformed in a direction in which a clearance between the first linear portion of the first segment conductor and the second linear portion of the first segment conductor is decreased,
the second segment conductor is fixed to the stator core in a state where the coupling portion of the second segment conductor is elastically deformed in a direction in which a clearance between the first linear portion of the second segment conductor and the second linear portion of the second segment conductor is decreased, and
the third segment conductor is fixed to the stator core in a state where the coupling portion of the third segment conductor is elastically deformed in a direction in which a clearance between the first linear portion of the third segment conductor and the second linear portion of the third segment conductor is decreased.

6. The stator of claim 5, wherein
a side surface of the tip end of the second linear portion of the first segment conductor comprises a recess, the side surface being a side surface on a third slot side,
a side surface of the tip end of the first linear portion of the second segment conductor comprises a recess, the side surface being a side surface on a first slot side,
the recess of the second linear portion of the first segment conductor and the recess of the first linear portion of the second segment conductor are in contact with each other in the second slot,
a side surface of the tip end of the second linear portion of the second segment conductor comprises a recess, the side surface being a side surface on a fourth slot side,
a side surface of the tip end of the first linear portion of the third segment conductor comprises a recess, the side surface being a side surface on a second slot side, and
the recess of the second linear portion of the second segment conductor and the recess of the first linear portion of the third segment conductor are in contact with each other in the third slot.

* * * * *